United States Patent
Handa et al.

(10) Patent No.: US 11,142,092 B2
(45) Date of Patent: Oct. 12, 2021

(54) POWER SUPPLY SYSTEM FOR VEHICLE

(71) Applicant: TOYOTA JIDOSHA KABUSHIKI KAISHA, Toyota (JP)

(72) Inventors: Manabu Handa, Nisshin (JP); Kenshi Yamanaka, Nukata-gun (JP); Kenji Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/775,445

(22) Filed: Jan. 29, 2020

(65) Prior Publication Data

US 2020/0282862 A1 Sep. 10, 2020

(30) Foreign Application Priority Data

Mar. 6, 2019 (JP) .............................. JP2019-040767

(51) Int. Cl.
*B60L 58/20* (2019.01)
*B60L 53/22* (2019.01)
*H02J 7/00* (2006.01)

(52) U.S. Cl.
CPC .............. *B60L 58/20* (2019.02); *B60L 53/22* (2019.02); *H02J 7/0019* (2013.01); *B60L 2210/10* (2013.01); *H02J 2310/48* (2020.01)

(58) Field of Classification Search
CPC .. B60L 2210/10; B60L 2210/12; B60L 58/20; B60L 53/22; B60L 2270/147; B60L 1/00; H02J 7/0019; H02J 2310/48; H02J 7/342; H02J 2207/40; H02J 2270/147; Y02T 90/14; Y02T 10/7072; Y02T 10/92; Y02T 10/70; Y02T 10/72; H02M 1/44; H02M 3/33569; H02M 1/088; H02M 1/0054
USPC ........................................ 320/103, 109, 104
See application file for complete search history.

(56) References Cited

U.S. PATENT DOCUMENTS

| | | | |
|---|---|---|---|
| 2012/0062167 A1* | 3/2012 | Hachiya | B60L 58/20 320/103 |
| 2012/0173066 A1 | 7/2012 | Yamada et al. | |
| 2016/0207403 A1 | 7/2016 | Iida et al. | |

FOREIGN PATENT DOCUMENTS

| | | |
|---|---|---|
| JP | 2011-061921 A | 3/2011 |
| JP | 2016-134976 A | 7/2016 |

* cited by examiner

*Primary Examiner* — Paul Dinh
(74) *Attorney, Agent, or Firm* — Oliff PLC

(57) ABSTRACT

A power supply system for a vehicle is provided, and the system may include: a charging inlet connected to a main battery and connectable to a power supply external to the vehicle; a voltage converter configured to step down a power of the main battery by a switching element and supply the stepped-down power to a sub-battery; and a controller configured to control the voltage converter, in which the controller is configured to slow down a switching speed of the switching element, as compared with when the main battery is not being charged, while the charging inlet is connected to the power supply and the main battery is being charged by the power supply.

1 Claim, 3 Drawing Sheets

POWER SUPPLY SYSTEM FOR VEHICLE

CROSS-REFERENCE

This application claims priority to Japanese Patent Application No. 2019-040767, filed on Mar. 6, 2019, the entire contents of which are incorporated herein by reference.

TECHNICAL FIELD

The technology disclosed herein relates to a power supply system for a vehicle.

BACKGROUND

A power supply system mounted on an electric vehicle includes a main battery that stores power to be supplied to a traction motor (see, for example, Japanese Patent Application Publication No. 2016-134976). There is a type of electric vehicle that is capable of charging the main battery with a power supply external to the vehicle. The power supply system for an electric vehicle described in Japanese Patent Application Publication No. 2016-134976 includes a main battery and a charging inlet connected to the main battery and connectable to a power supply external to the vehicle. The power supply system of Japanese Patent Application Publication No. 2016-134976 further includes a voltage converter that steps down the power of the main battery by a switching element and supplies the stepped-down power to a sub-battery. The sub-battery supplies the power to a device that operates at a voltage lower than an output voltage of the main battery. Devices that operate at a voltage lower than the output voltage of the main battery may collectively be referred to as "accessories". Examples of the accessories include a radio, a room lamp, and the like.

SUMMARY

When a user uses an accessory, such as a radio or a room lamp, a remaining power amount of a sub-battery decreases. A controller of a power supply system starts up a voltage converter when the remaining power amount of the sub-battery decreases while the main battery is being charged with a power supply external to the vehicle. There may be some cases where the voltage converter connected to the main battery operates while the main battery is being charged with the power supply external to the vehicle. That is, the voltage converter during operation is electrically conducted with the power supply external to the vehicle via a charging inlet. At this occasion, noise generated by the voltage converter may propagate to the power supply via the charging inlet and affect the power supply. Typically, a low pass filter is introduced to suppress the noise. However, the introduction of the low pass filter leads to an increase in cost and also requires a space to install the low pass filter. It is desirable that a device to be mounted on a vehicle has a small body. Technology is provided herein which reduces the influence of noise generated by a voltage converter connected between a main battery and a sub-battery, on an external power supply, without relying on a low pass filter.

The voltage converter includes a switching element for converting a voltage. Noise due to a switching operation of the switching element (i.e., switching noise) is one of factors that influences the external power supply. By decreasing a switching speed, the switching noise can be reduced. However, the decrease in the switching speed may increase loss in the voltage converter. A power supply system disclosed herein decreases the switching speed when a main battery is being charged with an external power supply via a charging inlet, thereby reducing switching noise. When the main battery is not being charged, the switching speed is returned to a normal speed, thereby suppressing the loss in the voltage converter. The power supply system disclosed herein can reduce the influence of noise on the external power supply by switching the switching speed, without relying on a low pass filter. In addition, a high voltage conversion efficiency can be obtained when the external power supply is not connected.

A power supply system for a vehicle disclosed herein may comprise: a charging inlet connected to a main battery and connectable to a power supply external to the vehicle; a voltage converter configured to step down a power of the main battery by a switching element and supply the stepped-down power to a sub-battery; and a controller configured to control the voltage converter, wherein the controller is configured to slow down a switching speed of the switching element, as compared with when the main battery is not being charged, while the charging inlet is connected to the power supply and the main battery is being charged with the power supply. The technology disclosed herein is configured to suppress the switching noise by controlling the voltage converter. Thus, the technology herein can reduce noise without relying on a low pass filter. The loss in the voltage converter does not increase because the switching speed is not decreased while the main battery is not being charged.

A first resistive element and a second resistive element may be selectively connected between a driving circuit configured to drive the switching element and a gate of the switching element. A resistance value of the second resistive element is larger than a resistance value of the first resistive element. The controller may be configured to select the second resistive element when the charging inlet is connected to the power supply and the main battery is being charged with the power supply, and select the first resistive element when the main battery is not being charged. By including two selectable resistive elements, the switching speed can be easily switched. When employing two resistive elements, a resistive element and a switch need to be newly added. However, a total number of parts is small, as compared to when additionally employing a low pass filter.

The details and further improvement of the technology disclosed herein will be described in "DETAILED DESCRIPTION" below.

DETAILED DESCRIPTION

Embodiment

Figure 1:
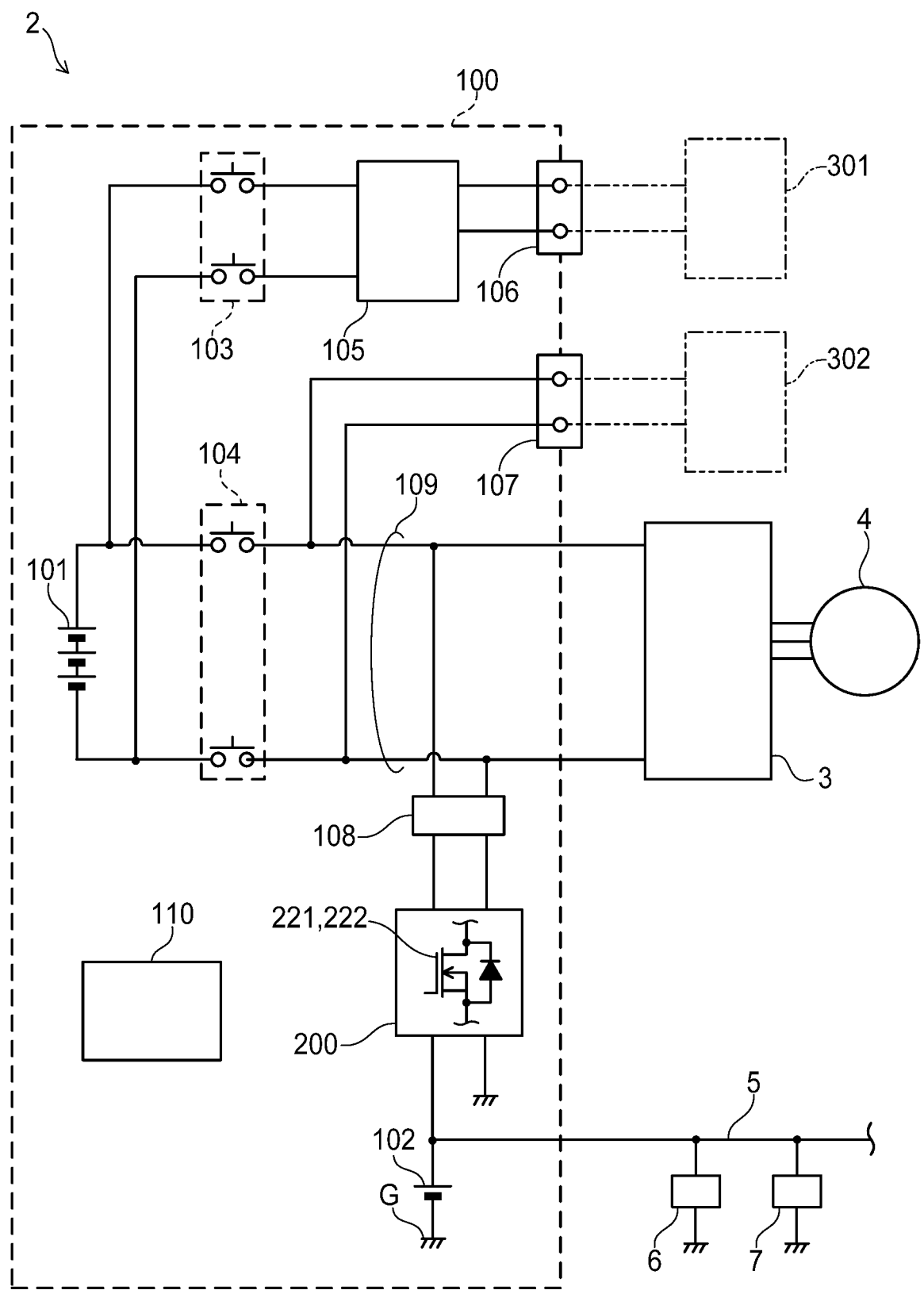
FIG. 1 is a block diagram of a power system of an electric vehicle that comprises a power supply system of an embodiment.

Referring to the figures, a power supply system 100 of an embodiment will be described below. The power supply system 100 is a power supply system for a vehicle and mounted on an electric vehicle 2. FIG. 1 is a block diagram of a power system of the electric vehicle 2 that comprises the power supply system 100. The electric vehicle 2 of the embodiment can be driven by a traction motor 4. The power supply system 100 supplies power to the motor 4 and also to accessories mounted on the electric vehicle 2. A driving voltage of the motor 4 is 100 volts or more. The term "accessories" as used herein is a collective term for vehicle-mounted devices driving powers of which are lower than a driving power of the motor 4. Examples of the accessories include a radio 6 and a room lamp 7. The electric vehicle 2 includes many accessories other than the radio 6 and the room lamp 7, but illustration thereof is omitted.

The electric vehicle 2 includes the power supply system 100, an inverter 3, the motor 4, the radio 6, and the room lamp 7. An accessory power line 5 extends around a body of the electric vehicle 2, and the accessories such as the radio 6 and the room lamp 7 are supplied with power from the accessory power line 5. The body of the vehicle serves as a ground G for the accessories.

The power supply system 100 comprises a main battery 101, a sub-battery 102, a charging relay 103, a system main relay 104, a low pass filter 108, a voltage converter 200, and a power supply controller 110.

The main battery 101 stores power for the traction motor 4. The main battery 101 is a rechargeable battery, such as a lithium-ion battery. An output voltage of the main battery 101 is, for example, 200 volts.

The sub-battery 102 stores power for driving the accessories, such as the radio 6 as mentioned above. An output voltage of the sub-battery 102 is lower than the output voltage of the main battery 101. The output voltage of the sub-battery 102 is, for example, 12 volts. The accessory power line 5 is connected to a positive electrode of the sub-battery 102, by which the power is supplied to the accessories, such as the radio 6, via the accessory power line 5.

The main battery 101 is connected to the inverter 3 via the system main relay 104. The system main relay 104 is controlled by the power supply controller 110. When a main switch (not shown) of the vehicle is turned on, the power supply controller 110 closes the system main relay 104 and connects the main battery 101 to the inverter 3. When the main battery 101 is connected to the inverter 3, the electric vehicle 2 is ready to run.

A main power line 109 on an inverter 3 side of the system main relay 104 is connected to the voltage converter 200 as well as to the inverter 3. The voltage converter 200 includes switching elements 221 and 222. The voltage converter 200 is a step-down converter, and steps down the power of the main battery 101 by the switching elements 221 and 222 and supplies the stepped-down power to the sub-battery 102. As aforementioned, the sub-battery 102 supplies power to the accessories, such as the radio 6. When a remaining power amount (i.e., state of charge: SOC) of the sub-battery 102 becomes small, the power supply controller 110 starts up the voltage converter 200 and charges the sub-battery 102 with the power of the main battery 101. FIG. 1 schematically shows that the voltage converter 200 includes the switching elements 221 and 222. A circuit configuration of the voltage converter 200 will be described in detail later with reference to FIG. 2.

The voltage converter 200 is connected to the main battery 101 via the low pass filter 108. Although the detailed description of this structure is omitted, the low pass filter 108 has a structure in which a plurality of LC filters, each LC filter configured with a coil and a capacitor, is connected in series. The low pass filter 108 may have a structure in which a choke coil, a Y capacitor, and an X capacitor are combined together. The low pass filter 108 reduces noise generated by the voltage converter 200.

The power supply system 100 further comprises an AC charger 105, an AC charging inlet 106, and a DC charging inlet 107. The power supply system 100 is configured to charge the main battery 101 with a power supply, which is external to the vehicle. In FIG. 1, an AC power supply 301 and a DC power supply 302 are drawn with virtual lines as the external power supplies.

The AC charger 105 and the AC charging inlet 106 are provided to charge the main battery 101 with the external AC power supply 301 for supplying an AC power. The AC charging inlet 106 is provided on the body of the vehicle and can be connected to the external AC power supply 301. The AC charger 105 is connected to the AC charging inlet 106 and also connected to the main battery 101 via the charging relay 103.

The AC charger 105 is an AC-DC converter and converts the AC power supplied from the external AC power supply 301 into a DC power which is suitable for charging the main battery 101.

The AC charging inlet 106 is provided with a sensor (not shown). When the external AC power supply 301 is connected to the AC charging inlet 106, a connection signal is fed from the sensor to the power supply controller 110. When detecting that the AC power supply 301 has been connected, the power supply controller 110 closes the charging relay 103 and connects the AC charger 105 to the main battery 101. The power supply controller 110 starts up the AC charger 105 when the supply of power from the AC power supply 301 is started. As aforementioned, the AC charger 105 converts the AC power supplied from the AC power supply 301 into a DC power, and supplies the DC power to the main battery 101.

The DC charging inlet 107 is also provided on the body of the vehicle and can be connected to the external DC power supply 302 for supplying the DC power. The DC charging inlet 107 is also provided with a sensor (not shown). When the external DC power supply 302 is connected to the DC charging inlet 107, a connection signal is fed from the sensor to the power supply controller 110. The DC charging inlet 107 is connected to the main battery 101 via the main power line 109 and the system main relay 104. When detecting that the DC power supply 302 has been connected while the system main relay 104 is opened, the power supply controller 110 closes the system main relay 104 and connects the DC charging inlet 107 with the main battery 101. The main battery 101 is charged when the DC power is fed from the external DC power supply 302.

A plug of the AC power supply 301 and a plug of the DC power supply 302 have different shapes, and thus the AC power supply 301 is not connectable to the DC charging inlet 107, similarly the DC power supply 302 is not connectable to the AC charging inlet 106.

Even while the main battery 101 is being charged with the external AC power supply 301 or DC power supply 302, the accessories, such as the radio 6 and the room lamp 7, are usable. When using the accessori(es) while the main battery 101 is being charged, the remaining power amount of the sub-battery 102 becomes gradually small. As aforementioned, when the remaining power amount of the sub-battery 102 becomes small, the power supply controller 110 starts up the voltage converter 200 and then charges the sub-battery 102 with the power of the main battery 101. When the voltage converter 200 is started up while being connected to the external AC power supply 301 or DC power supply 302, noise generated by the voltage converter 200 propagates to the AC power supply 301 or DC power supply 302 via the power supply line. Thus, the noise generated by the voltage converter 200 may influence the AC power supply 301 or DC power supply 302. The low pass filter 108 reduces the noise generated by the voltage converter 200. However, to sufficiently reduce the noise, a strong low pass filter is necessary. The strong low pass filter is costly and requires a considerable space inside the vehicle. The power supply system 100 of the embodiment has a function of reducing the noise of the voltage converter 200 without relying on a low pass filter. By reducing the noise of the voltage converter 200 without relying on any low pass filter, the noise propagating to the AC power supply 301 or the DC power supply 302 can be sufficiently suppressed by the small low pass filter 108.

Next, a mechanism for reducing noise of the voltage converter 200 without relying on a low pass filter will be described. This function of the mechanism is to reduce a load on a low pass filter and used together with the low pass filter to thereby effectively suppress the noise.

Figure 2:
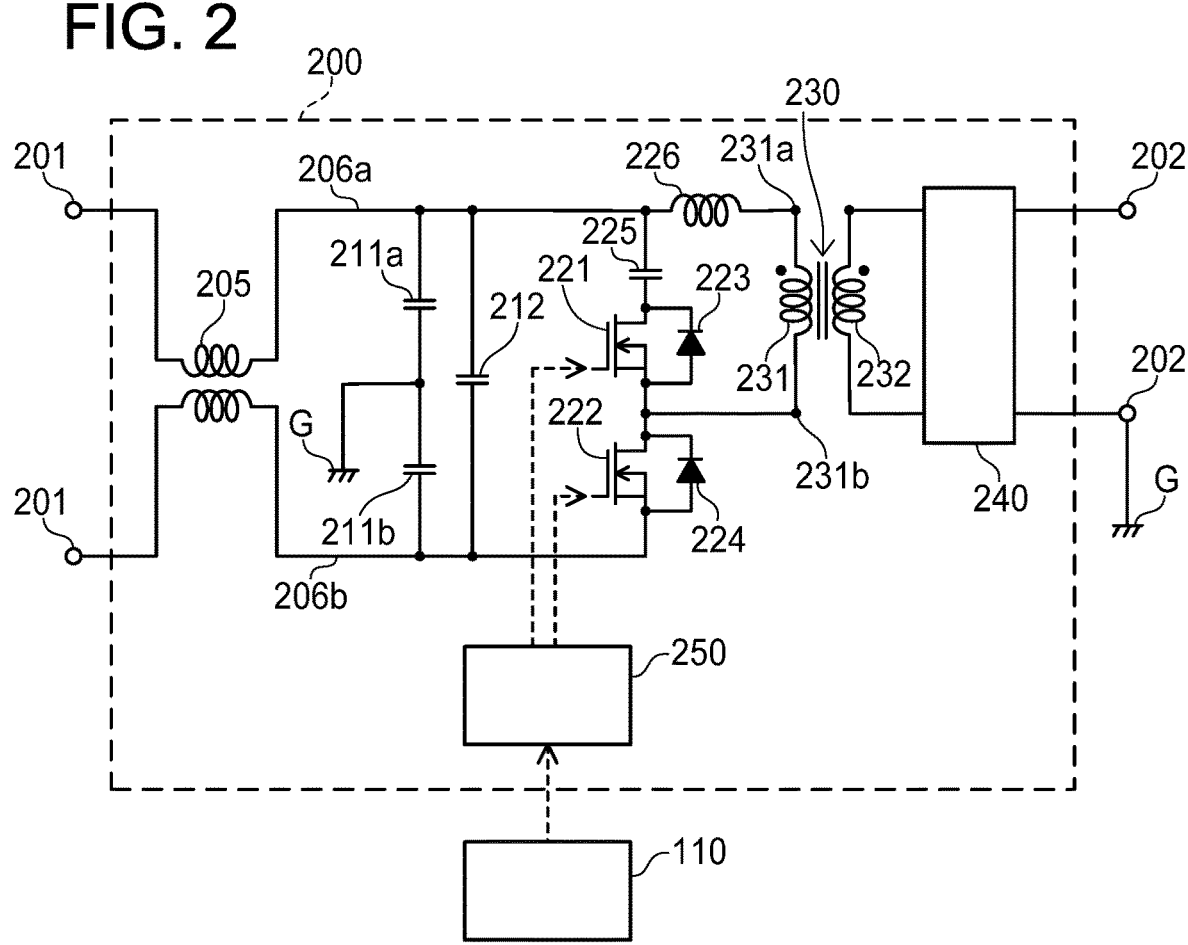
FIG. 2 is a schematic circuit diagram of a voltage converter.

FIG. 2 is a circuit diagram of the voltage converter 200. The voltage converter 200 converts the voltage mainly using two switching elements 221 and 222 and a transformer 230. Noise (switching noise) is generated by operations of the switching elements 221 and 222. The voltage converter 200 includes, in addition to these main components, several components that suppress noise.

The main power line 109 is connected to input terminals 201 of the voltage converter 200, while the sub-battery 102 is connected to output terminals 202 of the voltage converter 200 (see FIG. 1). A choke coil 205, two Y capacitors 211a and 211b, and an X capacitor 212 are connected on a input terminals 201 side.

The choke coil 205 is connected between the input terminals 201 and each of a positive line 206a and a negative line 206b that are inside the voltage converter 200. The two Y capacitors 211a and 211b are connected in series between the positive line 206a and the negative line 206b. A midpoint of the series connection of the two Y capacitors 211a and 211b is connected to the ground G. The X capacitor 212 is connected between the positive line 206a and the negative line 206b. The choke coil 205 and the Y capacitors 211a and 211b suppress common-mode noise. The X capacitor 212 suppresses differential-mode noise. The choke coil 205, the Y capacitors 211a and 211b, and the X capacitor 212 are passive elements for noise reduction.

The two switching elements 221 and 222 are connected in series between the positive line 206a and the negative line 206b. A freewheeling diode 223 is connected in anti-parallel with the switching element 221, while a freewheeling diode 224 is connected in anti-parallel with the switching element 222.

One end 231a of a primary coil 231 of the transformer 230 is connected to the positive line 206a. Another end 231b of the primary coil 231 is connected to a midpoint of the series connection of the two switching elements 221 and 222. The two switching elements 221 and 222 are controlled by a driving circuit 250. The driving circuit 250 drives the switching elements 221 and 222 such that when one switching element 221 is turned on (or off), the other switching element 222 is turned off (or on). When the two switching elements 221 and 222 alternately turn on and off, AC current is generated in the primary coil 231, while an induced current is generated in a secondary coil 232. A voltage depending on a winding ratio of the primary coil 231 to the secondary coil 232 is generated in the secondary coil 232. That is, the voltage of input power is stepped down in accordance with the winding ratio of the transformer 230. A rectifier circuit 240 is connected to the secondary coil 232. The rectifier circuit 240 converts an AC power generated in the secondary coil 232 into a DC power. An output of the rectifier circuit 240 is connected to the output terminals 202 of the voltage converter 200. The power (AC) stepped down by the transformer 230 is converted into a DC power by the rectifier circuit 240 and is then output therefrom.

The driving circuit 250 receives a command from the power supply controller 110 and send a driving signal to each of the switching elements 221 and 222. That is, the voltage converter 200 starts up by the command from the power supply controller 110.

A capacitor 225 and the coil 226 are connected in series between the one end 231a of the primary coil 231 and a drain of the switching element 221. The capacitor 225 and the coil 226 constitute an LC-type low pass filter (LC filter). The LC filter constituted of the capacitor 225 and the coil 226 also removes switching noise.

As mentioned above, the voltage converter 200 includes several noise removal elements (the choke coil 205, the Y capacitors 211a and 211b, the X capacitor 212, and the capacitor 225 and coil 226 which constitute the LC filter). However, these elements cannot sufficiently reduce switching noise. Thus, the power supply system 100 includes the low pass filter 108 on the input side of the voltage converter 200 (see FIG. 1). By decreasing the switching speeds of the switching elements 221 and 222, the power supply system 100 further reduces switching noise.

The reduction of noise by decreasing the switching speed will be described below. The switching noise can be reduced by decreasing the switching speed. Meanwhile, the decrease of switching speed leads to increase of the loss in the voltage converter. The power supply system 100 of the embodiment slows down the switching speeds of the switching elements 221 and 222, as compared with when the main battery 101 is not being charged, while the AC charging inlet 106 or DC charging inlet 107 is connected to the power supply (AC power supply 301 or DC power supply 302) and the main battery 101 is being charged with the power supplied from the power supply. The influence of noise on the external power supply is reduced by decreasing the switching speed only when the external power supply is connected, whereas the loss in the voltage converter 200 is suppressed when the power supply is not connected.

Figure 3:
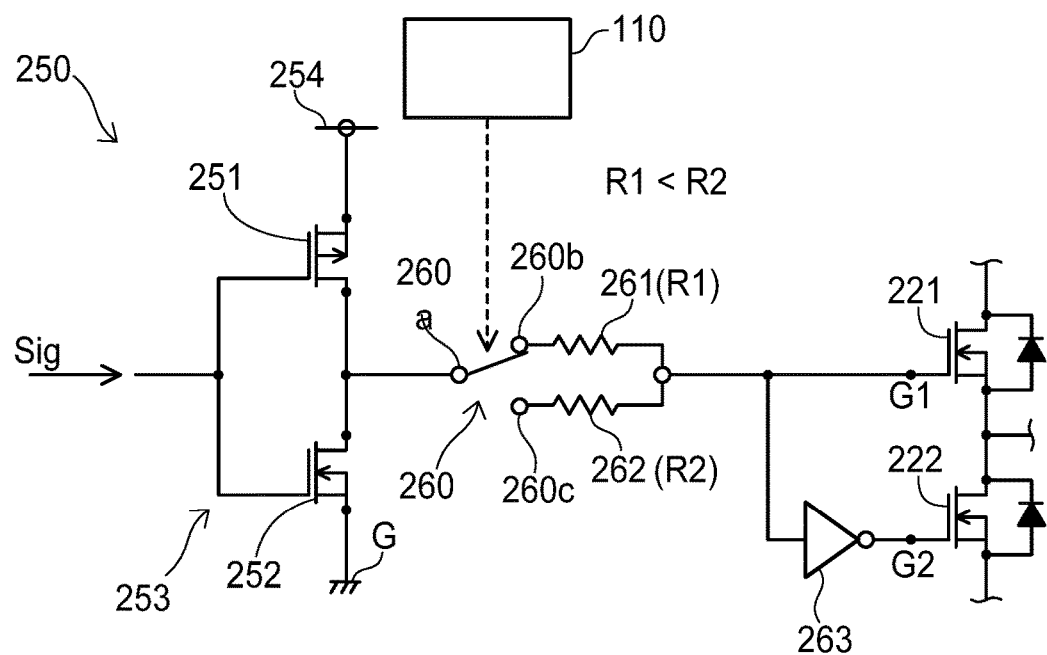
FIG. 3 is a circuit diagram of an example of a driving circuit and a resistive element switching circuit.

An example of a configuration for changing the switching speed will be described below. FIG. 3 is a schematic circuit diagram of the driving circuit 250 and the switching elements 221 and 222.

The driving circuit 250 includes a series connection of a p-channel MOS transistor 251 and an n-channel MOS transistor 252. The series connection of the p-channel MOS transistor 251 and the n-channel MOS transistor 252 is called a Complementary Metal Oxide Semiconductor (CMOS). Hereinafter, for convenience of description, the p-channel MOS transistor 251 disposed on a high potential side is referred to as an upper transistor 251, while the n-channel MOS transistor 252 disposed on a low potential side is referred to as a lower transistor 252. The series connection of the upper transistor 251 and the lower transistor 252 is hereinafter referred to as a CMOS 253.

A power supply 254 is connected to a source electrode of the upper transistor 251, and a source electrode of the lower transistor 252 is connected to the ground G. An input pulse signal Sig is inputted to each of gates of the upper transistor 251 and the lower transistor 252. When the input pulse signal Sig is at a HIGH level, the upper transistor 251 turns off, while the lower transistor 252 turns on. That is, an output of the CMOS 253 is kept at the LOW level. When the input pulse signal Sig is switched from the HIGH level to a LOW level, the upper transistor 251 turns on and the lower transistor 252 turns off. That is, the output of the CMOS 253 is switched from the LOW level to the HIGH level.

An output terminal of the CMOS 253, i.e., an output terminal of the driving circuit 250 is connected to an input terminal 260a of a switch 260. The switch 260 includes two output terminals 260b and 260c, which are connected to a first resistive element 261 and a second resistive element 262, respectively. Other ends of the first resistive element 261 and the second resistive element 262 are connected to a gate G1 of the switching element 221 and a gate G2 of the switching element 222, respectively. An inverting element 263 is connected between the gate G2 of the switching element 222 and the other terminals of the first resistive element 261 and the second resistive element 262. Therefore, when the driving signal supplied to the gate G1 of the switching element 221 is at the HIGH level (or LOW level), the driving signal supplied to the gate G2 of the switching element 222 is at the LOW level (or HIGH level). By connecting the inverting element 263 to the gate G2 of one switching element 222 and supplying the same driving signal to the gate G1 of the switching element 221 and to an input terminal of the inverting element 263, the switching elements 221 and 222 have their operations reversed.

A resistance value R2 of the second resistive element 262 is larger than a resistance value R1 of the first resistive element 261 (R2>R1). The switch 260 switches a resistance between the output terminal of the driving circuit 250 and the gate of the switching element 221, to either the first resistive element 261 or the second resistive element 262. The switch 260 is switched based on a command from the power supply controller 110.

The power supply controller 110 selects the second resistive element 262 while the AC charging inlet 106 or DC charging inlet 107 is connected to the power supply (AC power supply 301 or DC power supply 302), and the main battery 101 is being charged with the power supplied from the power supply. That is, the power supply controller 110 connects the output terminal of the driving circuit 250 and the gate of the switching element 221 via the second resistive element 262.

The power supply controller 110 selects the first resistive element 261 when the main battery 101 is not being charged with the external power supply. That is, the power supply controller 110 connects the output terminal of the driving circuit 250 and the gate of the switching element 221 via the first resistive element 261 when the main battery 101 is not being charged with the external power supply.

As aforementioned, the resistance value R2 of the second resistive element 262 is larger than the resistance value R1 of the first resistive element 261. Thus, when the second resistive element 262 is selected, a rising rate of the gate voltage (voltage of the signal applied to the gate) becomes slower as compared with when the first resistive element 261 is selected. This means that when the second resistive element 262 is selected, the switching speed of the switching element 221 becomes slower as compared with when the first resistive element 261 is selected.

By including the switch 260, the first resistive element 261, and the second resistive element 262, the power supply controller 110 slows down the switching speeds of the switching elements 221 and 222 as compared with when the main battery 101 is not being charged, while the main battery 101 is being charged with the power supply external to the vehicle.

Figure 4A:
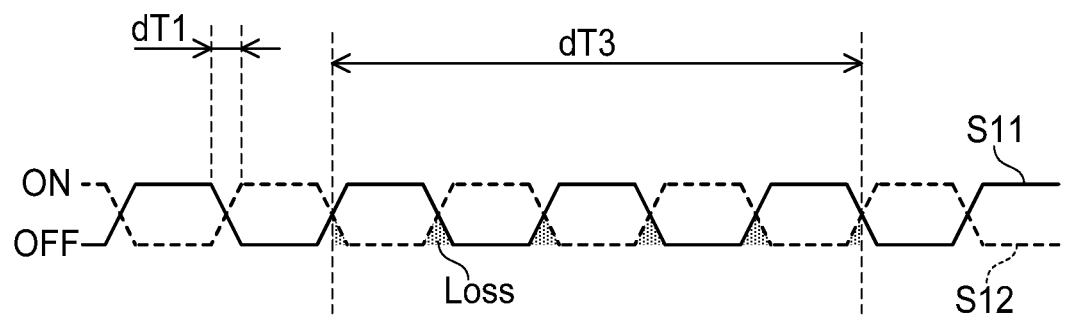
FIG. 4A is a switching timing chart when the first resistive element is selected.
Figure 4B:
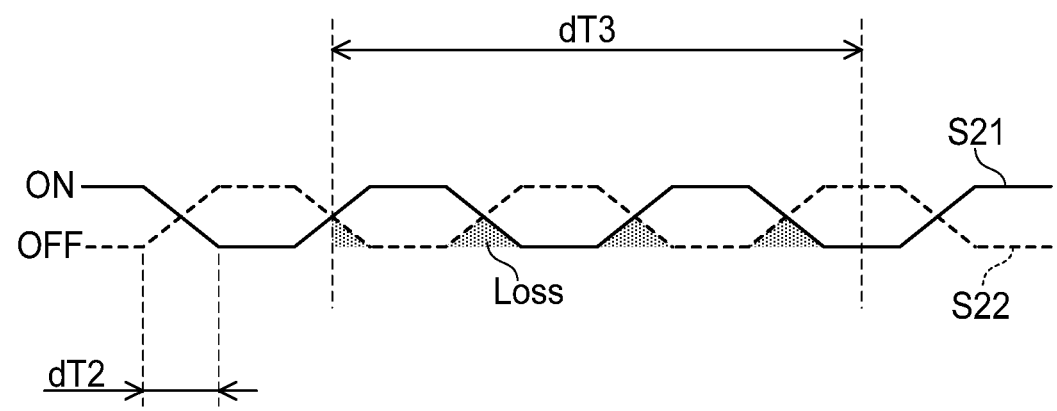
FIG. 4B is a switching timing chart when the second resistive element is selected.

FIG. 4A is a switching timing chart when the first resistive element is selected; and FIG. 4B is a switching timing chart when the second resistive element is selected. Solid lines S11 and S21 in graphs of FIGS. 4A and 4B indicate timing charts of on/off of the switching element 221, while dotted lines S12 and S22 in these graphs indicate timing charts of on/off of the switching element 222. The on/off operations of the switching elements 221 and 222 are reversed each other as aforementioned.

When the first resistive element 261 with a smaller resistance value is selected, time required for switching is a time dT1, whereas when the second resistive element 262 with a larger resistance value is selected, the time required for switching is a time dT2 (>dT1). The graphs in FIGS. 4A, 4B show that when the second resistive element 262 is selected, the switching speed becomes slower as compared with when the first resistive element 261 is selected.

When the first resistive element 261 is selected, the switching is performed approximately 5.0 times during a certain period of time dT3 (see FIG. 4A). In contrast, when the second resistive element 262 is selected, the switching is performed approximately 3.5 times only during the time period dT3 (see FIG. 4B). When the second resistive element 262 is selected, a decrease in number of times of switching during a certain period of time can also contribute to the reduction of noise.

Gray parts in FIGS. 4A, 4B indicate positions where switching loss occur. A size of an area of the gray parts has a positive correlation with the switching loss. The gray area in FIG. 4B is larger than the gray area in FIG. 4A. That is, when the second resistive element 262 is selected to decrease the switching speed, the switching loss increases as compared with when the first resistive element 261 is selected. The second resistive element 262 is selected when the main battery 101 is being charged with the external power supply. When the main battery 101 is not being charged with the external power supply, the switching loss does not become large because the first resistive element 261 is selected.

As aforementioned, the voltage converter 200 is started up when the remaining power amount of the sub-battery 102 is below a predetermined power threshold. When the remaining power amount of the sub-battery 102 is higher than the power threshold value, the voltage converter 200 is not started up. The power supply controller 110 does not need to change the switching speed as long as the voltage converter 200 is not started up, even when the main battery 101 is being charged.

As mentioned above, when the voltage converter 200 is started up while the main battery 101 is being charged with the external power supply, the power supply system 100 of the embodiment decreases the switching speeds of the switching elements 221 and 222 of the voltage converter 200, as compared with when the main battery 101 is not being charged with the external power supply. By decreasing the switching speed, the switching noise is reduced so that the influence of the noise on the external power supply is also reduced. The power supply system 100 can reduce the switching noise of the voltage converter without relying on a low pass filter.

As aforementioned, switching noise is effectively reduced by both the control of decreasing the switching speed and the use of the low pass filter 108 (see FIG. 1). Although this is merely an example, by introducing the control of decreasing the switching speed, the size of the low pass filter 108 can be reduced by 25%, as compared with when the control of decreasing the switching speed is not performed.

Some points to be noted with regard to technologies described in the embodiment will be described. The power supply controller 110 of the power supply system 100 in the embodiment decreases the switching speed, as compared with when the main battery 101 is not being charged, when the voltage converter 200 is started up while the main battery 101 is being charged with the external power supply device. The power supply controller 110 may be configured to decrease switching speed, as compared with when the main battery 101 is not being charged, when the voltage converter 200 is started up while the external power supply is connected to the charging inlets 106 and 107.

The power supply system 100 of the embodiment is applied to the electric vehicle 2. Examples of the electric vehicle described herein include a hybrid vehicle that includes a traction motor and an engine, an automobile that includes both a battery and a fuel cell as a power source for the motor.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed.

Further, the purpose of the examples illustrated by the present description or drawings is to satisfy multiple objectives simultaneously, and satisfying any one of those objectives gives technical utility to the present disclosure.

What is claimed is:

1. A power supply system for a vehicle, the system comprising:
   a charging inlet connected to a main battery and connectable to a power supply external to the vehicle;
   a voltage converter configured to step down a power of the main battery by a switching element and supply the stepped-down power to a sub-battery;
   a first resistive element and a second resistive element that are selectively connected between a driving circuit configured to drive the switching element and a gate of the switching element, a resistance value of the second resistive element being larger than a resistance value of the first resistive element; and
   a controller configured to:
      control the voltage converter;
      slow down a switching speed of the switching element, as compared with when the main battery is not being charged, while the charging inlet is connected to the power supply and the main battery is being charged with the power supply; and
      select the second resistive element when the charging inlet is connected to the power supply and the main battery is being charged with the power supply, and select the first resistive element when the main battery is not being charged.

* * * * *